US012689315B2

(12) United States Patent
Kulkarni et al.

(10) Patent No.: US 12,689,315 B2
(45) **Date of Patent: \*Jul. 21, 2026**

(54) OPEN-LOOP MOTOR CONTROL

(71) Applicant: TEXAS INSTRUMENTS INCORPORATED, Dallas, TX (US)

(72) Inventors: Sameer Kulkarni, Pune (IN); Prasad Kulkarni, Bengaluru (IN); Ganapathi Hegde, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,921

(22) Filed: Jun. 29, 2022

(65) Prior Publication Data

US 2024/0007035 A1     Jan. 4, 2024

(51) Int. Cl.
*H02P 21/18* (2016.01)
*H02P 21/22* (2016.01)

(52) U.S. Cl.
CPC .............. *H02P 21/18* (2016.02); *H02P 21/22* (2016.02)

(58) Field of Classification Search
CPC ............. H02P 21/18; H02P 21/22; H02P 6/21
See application file for complete search history.

(56) References Cited

U.S. PATENT DOCUMENTS

| | | | | |
|---|---|---|---|---|
| 4,684,865 A * | 8/1987 | Auger | ........................ | H02P 8/04 |
| | | | | 318/696 |
| 11,444,558 B1 * | 9/2022 | Latham | .................. | H02P 21/141 |
| 11,764,710 B2 * | 9/2023 | Kulkarni | ................. | H02P 21/24 |
| | | | | 318/400.02 |
| 2007/0007922 A1 * | 1/2007 | Sarlioglu | ................ | H02P 21/32 |
| | | | | 318/438 |
| 2011/0227519 A1 * | 9/2011 | Horng | ........................ | H02P 6/21 |
| | | | | 318/400.11 |
| 2019/0386592 A1 * | 12/2019 | Mogensen | .............. | H02P 6/182 |
| 2020/0220486 A1 * | 7/2020 | Chen | ........................ | H02P 21/18 |
| 2020/0403549 A1 * | 12/2020 | Lee | ........................... | H02P 23/14 |
| 2021/0211079 A1 * | 7/2021 | Jian | ........................... | H02P 27/12 |
| 2023/0246571 A1 * | 8/2023 | Dinu | ....................... | H02P 6/182 |
| | | | | 318/400.11 |

FOREIGN PATENT DOCUMENTS

JP          4070467 B2  *  4/2008

OTHER PUBLICATIONS

MIT, 2.004 Dynamics and Control II, 2007, 1-5 (Year: 2007).*

* cited by examiner

*Primary Examiner* — Bickey Dhakal
(74) *Attorney, Agent, or Firm* — Xianghui Huang; Frank D. Cimino

(57)          ABSTRACT

A motor controller adapted to be coupled to a motor having a rotor. The motor controller includes a storage device containing software. The motor controller also includes a processor core coupled to the storage device and adapted to be coupled to the motor. The processor core is configured to operate the motor in an open-loop control in response to determining a speed of the rotor determined based on an inverse exponential function with respect to time.

14 Claims, 4 Drawing Sheets

OPEN-LOOP MOTOR CONTROL

BACKGROUND

Many types and configurations of electric motors are available including, for example, direct current (DC) motors and alternating current (AC) motors. AC motors are available in various types as well (including, for example, three-phase motors. A three-phase motor includes, for example, three pairs of stator windings, Three sinusoidal currents, one for each pair of stator windings, are generated by, for example, a DC-to-AC inverter. The three sinusoidal signals (e.g., currents) are 120 degrees out-of-phase with respect to each other. With reference to a first of the sinusoidal currents, a second current is 120 degrees out-of-phase, and a third current is 240 degrees out-of-phase with respect to the first of the sinusoidal currents.

SUMMARY

In one example, a motor controller adapted to be coupled to a motor having a rotor. The motor controller includes a storage device containing software. The motor controller also includes a processor core coupled to the storage device and adapted to be coupled to the motor. The processor core is configured to operate the motor in an open-loop control in response to determining a speed of the rotor determined based on an inverse exponential function with respect to time.

In another example, a motor controller also includes a storage device containing software and a processor core. The processor core is configured to operate the motor in an open-loop control in response to determining a speed of the rotor determined based on a quadratic function. The quadratic function includes a first term with respect to time and a second term with respect to the square of time, the first term including a first mechanical property of the motor, and the second term including a second mechanical property of the motor and a square of the first mechanical property.

In yet another embodiment, a method for controlling a motor having a rotor in an open-loop operation includes calculating rotor speed based on an inverse exponential function with respect to time and generating a current for the motor based on the calculated motor speed.

In another embodiment, a method for controlling a motor having a rotor in an open-loop operation includes calculating rotor speed based on quadratic function which includes a first term with respect to time and a second term with respect to a square of time. The first term includes a first mechanical property of the motor, and the second term includes a second mechanical property of the motor and a square of the first mechanical property. The method also includes generating a current for the motor based on the calculated motor speed.

BRIEF DESCRIPTION OF THE DRAWINGS

For a detailed description of various examples, reference will now be made to the accompanying drawings in which.

The same reference numbers or other reference designators are used in the drawings to designate the same or similar (either by function and/or structure) features.

DETAILED DESCRIPTION

The embodiments described herein pertain to a motor controller capable of open-loop and closed-loop control of a sensor-less motor. The motor controller described herein may be used in multiple types of systems such as electric vehicles (EVs), industrial applications, etc. A sensor-less motor has no sensor for, for example, measuring motor speed or rotor position. Instead, during closed-loop control, based on motor current, the controller estimates motor speed and rotor position and uses those estimated values to control the magnitude of the current supplied to the motor and thus the speed of the motor. The motor controller includes a speed and position estimator that estimates motor speed and rotor position. However, at initial start-up of the motor, until the motor speed becomes large enough, the estimated values of speed and position based on motor current are not accurate enough to use in closed-loop control of the motor. Accordingly, the motor controller initializes in an open-loop control of the motor in which a pre-determined value representing motor speed and a calculated rotor position are provided for controlling the motor. As explained below, the calculation of rotor position during open-loop control is based on an inverse exponential function with respect to time. One or more parameters included in the inverse exponential function may be based on a mechanical property of the motor such as motor friction and/or motor inertia. The use of the inverse exponential function advantageously permits the motor speed to increase to its target level more quickly and without losing synchronization than if other functions were used such as quadratic functions characteristic of some conventional motor open-loop control techniques. The open-loop acceleration of the motor using the inverse exponential function described herein achieves a more stable operation compared to the use of quadratic function. In response to the motor's speed being sufficiently large (e.g., close to its target speed), the controller discontinues open-loop control and implements closed-loop control of the motor.

In the example described herein, the motor control technique is a field-oriented control (FOC) technique for a three-phase sensor-less motor (e.g., a permanent magnet synchronous motor or an induction motor). The FOC control technique described herein also is applicable to single phase and three-phase grid synchronized inverters.

Figure 1:
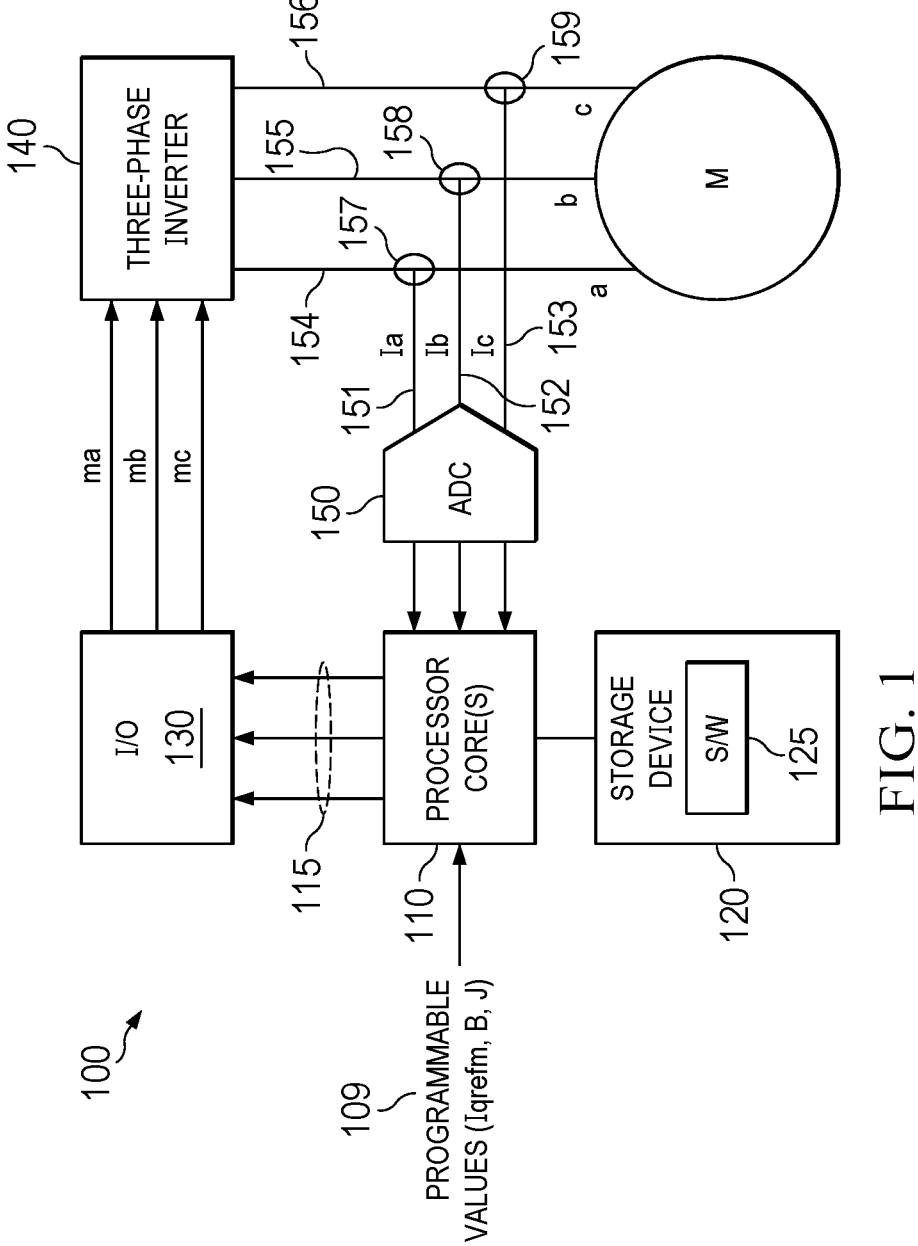
FIG. 1 is a block diagram of a motor and a system for controlling the motor in accordance with an example.

FIG. 1 is a block diagram of a three-phase motor system 100. The motor system 100 includes a processor core 110, a storage device 120, an input/output (I/O) interface 130, an analog-to-digital converter (ADC) 150, a three-phase inverter 140, and a motor M. The processor core 110 is coupled to the storage device 120 and executes software 125 stored in the storage device 120. Storage device 120 is a non-transitory storage device such as volatile memory (e.g., random access memory) or non-volatile memory (e.g., read-only memory), or combinations thereof. While a single processor core 110 is shown in FIG. 1, other embodiments include multiple processor cores that collectively execute the software 125. The processor core 110 implements the functionality described herein upon execution of software 125. Programmable values 109 may be provided to the processor core 110 (e.g., through storage in storage device 120 and retrieval by the processor core 110) via any suitable type of interface (e.g., Inter-Integrated Circuit (IIC or I2C)). The type and use of the programmable values is described below. The motor M includes three phases (e.g., a, b, and c phases), and each phase may utilize a pair of stator windings that receives a sinusoidal, or approximately sinusoidal, current from the three-phase inverter 140. Phases a, b, and c receive sinusoidal currents 154, 155, and 156, respectively, from the three-phase inverter 140.

The I/O interface 130 and the ADC 150 also are coupled to the processor core 110. The processor core 110 generates control signals on signal lines 115 that the I/O interface 130 outputs to the three-phase inverter 140 as signals ma, mb, and mc. The I/O interface 130 may include buffers to drive signals ma, mb, and mc to the three-phase inverter 140. As explained below, the three-phase inverter 140 includes a pair of transistors/switches (a high side transistor coupled to a low side transistor at a switch node) for each of the three phases a, b, and c. Each of the signals ma, mb, and mc from the processor core 110 is used by the inverter 140 to implement the duty cycle for the respective high side and low side transistors. The duty cycle for the high side transistor is $$\frac{1+m}{2},$$

where m is the respective value of ma, mb, or mc. The duty cycle for the corresponding low side transistor is $$1-\frac{1+m}{2}.$$

The values of m (and thus the duty cycle values) are varied sinusoidally by the processor core 110. By varying the duty cycles of each pair of transistors over time in a sinusoidal fashion for each phase, a sinusoidal current for that phase is generated.

The ADC 150 receives analog signals Ia 151, Ib 152, and Ic 153 from current sensors 157, 158, and 159, respectively. Analog signals Ia, Ib, and Ic represent (e.g., are directly proportional to) the instantaneous currents 154, 155, and 156 of the three phases a, b, and c, respectively. In one example, each of analog signals Ia, Ib, and Ic is a voltage proportional to the instantaneous magnitude of its respective phase current 154-156.

In one embodiment, the processor core 110, storage device 120, I/O interface 130, and ADC 140 are fabricated on the same integrated circuit (IC) (e.g., on a single semiconductor die or multiple semiconductor dies that are interconnected within an IC package). In another embodiment, the storage device 120 may be fabricated on an IC separate from the IC that includes the processor core 110, I/O interface 130, inverter 140, and ADC 150. In general, any two or more of the processor cores 110, storage device 120, I/O interface 130, inverter 140, and ADC 150 can be fabricated on the same IC. In another embodiment, the three-phase inverter 140 may be implemented on the same semiconductor die as the other circuit elements or can be fabricated on a separate semiconductor die but incorporated into the same IC package/module as the other circuit structures.

In one example, the processor core 110, upon execution of software 125, implements an FOC technique for controlling the operation of motor M. The FOC technique described below separately controls the torque and magnetic flux components of the motor's stator current. The following description of the FOC technique is applicable to closed-loop control of the motor in which rotor speed and flux position are calculated based on measurements of motor current. Following the description of closed-loop control, open-loop control is provided in which an inverse exponential function with respect to time is used to estimate flux position rather than using motor current.

Figure 2:
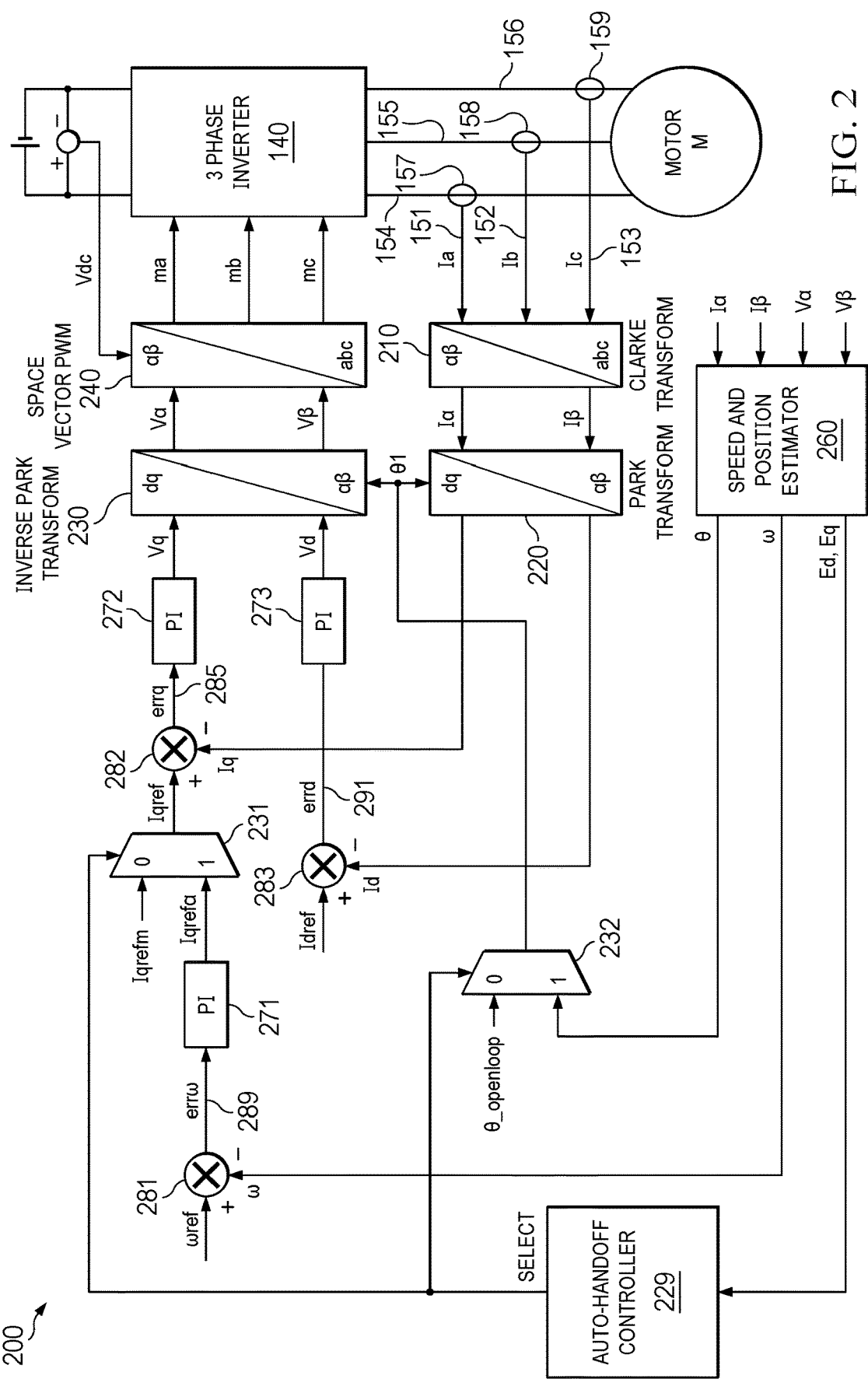
FIG. 2 is a functional block diagram of a field-oriented control (FOC) technique for controlling the motor and including an auto-handoff controller to switch motor control from open-loop control to closed-loop control in accordance with an example.

FIG. 2 is a functional block diagram 200 of the software 125 for implementing an FOC technique to control the speed of the motor. In alternative embodiments, the functional blocks included in FIG. 2 may be implemented using any combination of circuitry (e.g., processors, microprocessors, microcontrollers, memory, state machines, ADCs, digital to analog converters (DACs), flip-flops, registers, logic gates, and/or other types of logic circuits) and/or software.

The block diagram of FIG. 2 includes a Clarke transform 210, a Park transform 220, an inverse Park transform 230, and a space vector pulse width modulator (PWM) 240, which are used for both open-loop and closed-loop operation. The space vector PWM 240 includes an inverse Clarke transform. The block diagram 200 further includes a speed and position estimator 260, proportional integral (PI) controllers 271, 272, and 273, and subtractors 281, 282, and 283. The speed and position estimator 260, subtractor 281, and PI controller 271 are used for closed-loop operation, but not open-loop operation.

The digital values from ADC 150 (ADC 150 is not shown in FIG. 2) corresponding to analog signals Ia, Ib, and Ic are provided as inputs to the Clarke transform 210. In some embodiments, the digital equivalents of two of the three analog signals Ia-Ic are used by the Clarke transform 210, as explained below. Each of the current sensors 157-159 may be implemented as a sense resistor included within each of the inverter's three phases. Each phase may include a high side and low side transistor pair. The sense resistors may be coupled to the low side transistor within the respective phase. Current flows through the sense resistor only when the respective low side transistor is "on." Because the low side transistor and its high side transistor counterpart are reciprocally turned "on' and "off" at a sinusoidally varying duty cycle (explained below), the low side transistor is "off" during a portion of each switching period. When the low side transistor is "off," no current flows through the sense resistor and thus that phase's sense current signal (Ia-Ic) is not available for use by the Clarke transform. Accordingly, two of the sense current signals are used by the Clarke transform, with the selection varying as to which two sense current signals are to be used at any point in time.

The Clarke transform 210 projects the three-phase system (Ia, Ib, Ic) into a two-dimensional ($\alpha$, $\beta$) orthogonal system. The Clarke transform 210 implements the following equations to convert two of Ia, Ib and Ic to I$\alpha$ and I$\beta$. Currents Ia and Ib are assumed to be the two selected currents in Eq. (1), but in general, Eq. (1) uses any two of the three currents Ia, Ib, and Ic.

$$\begin{cases} I\alpha = Ia \\ I\beta = \dfrac{1}{\sqrt{3}} * Ia + \dfrac{2}{\sqrt{3}} * Ib \end{cases} \tag{1}$$

Figures 3, 4:
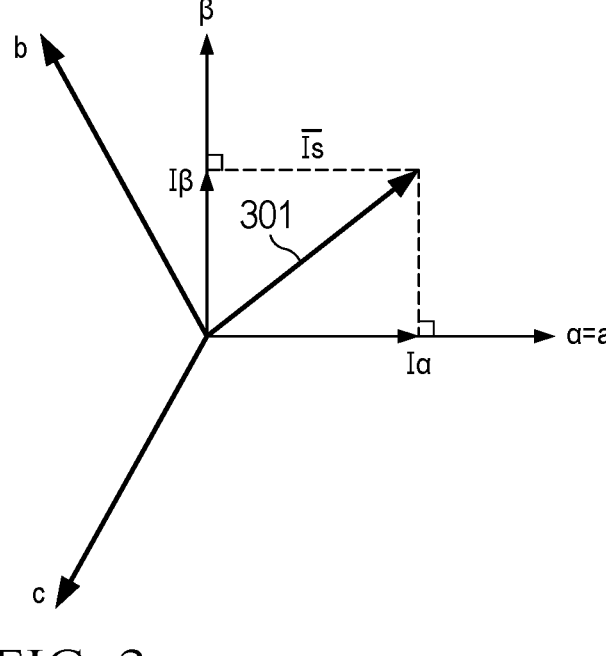
FIG. 3 is a vector diagram illustrating the relationship between the time-domain motor sense currents and an orthogonal reference implemented by the Clarke transformation.
FIG. 4 is a vector diagram illustrating the relationship between the orthogonal reference implemented by the Clarke transformation and a rotating reference frame implemented by the Park transformation.

FIG. 3 shows the relationship between the three-phase a, b, c coordinate system and the two-dimensional ($\alpha$, $\beta$) orthogonal system. Currents Ia-Ic are 120 degrees out of phase with respect to each other and are on the respective a, b and c axes in FIG. 3. Current vector I$\alpha$ is in-line with the a-axis (the a and $\alpha$-axes are colinear) and current vector I$\beta$ is along the $\beta$-axis. The $\beta$-axis is orthogonal to the $\alpha$-axis. Vector 301 is the complex stator current vector (Is) which is the vector sum of I$\alpha$ and I$\beta$ and thus is a mathematical combination (per Eq. (1)) of the motor's current signals Ia and Ib.

The Clarke transform 210 outputs I$\alpha$ and I$\beta$ as inputs to the Park transform 220. The Park transform 220 projects the ($\alpha$, $\beta$) orthogonal system onto a rotating reference frame (d,q) as shown in FIG. 4. The rotating reference frame is a reference frame that spins at a constant angular speed, which may or may not be same as the speed of the rotor. For permanent magnet synchronous motors, for example, the speed of the rotating reference frame is the same as rotor speed, and the d-axis of the rotating reference frame aligns with the d-axis of the rotor (e.g. the axis extending from the south pole of the magnet to the north pole of the magnet). Accordingly, the d-axis of the rotating reference frame is aligned with the rotor's flux. The angle $\theta$ between the $\alpha$-axis and the d-axis is the rotor flux position. In closed-loop control, the rotor flux position $\theta$ is computed by the speed and position estimator 260 and is provided to the Park transform 220. The q-axis is aligned with rotor torque. Based on I$\alpha$ and I$\beta$, in one embodiment, the Park transform 220 computes the flux (Id) and torque (Iq) components in the (d,q) domain as follows:

$$\begin{cases} Id = I\alpha * \cos(\theta) + I\beta * \sin(\theta) \\ Iq = -I\alpha * \sin(\theta) + I\beta * \cos(\theta) \end{cases} \tag{2}$$

The flux component Id and the torque component Iq are the outputs of the Park transform 220 and depend on the current vector components (I$\alpha$, I$\beta$) and on the rotor flux position $\theta$. Per the FOC control technique, processor core 110 controls the flux current component (Id) and the torque current component (Iq) independently.

During closed-loop operation, the speed and position estimator 260 receives as inputs the outputs I$\alpha$ and I$\beta$ from the Clarke transform 210, as well as signals V$\alpha$ and V$\beta$ which are output values from the inverse Park transform 230. Using the values of I$\alpha$, I$\beta$, V$\alpha$, and V$\beta$, the speed and position estimator 260 computes the back electromotive force (BEMF), and then using the computed BEMF, computes rotor speed $\omega$ and flux position $\theta$. In one embodiment, the speed and position estimator 260 computes the BEMF in the $\alpha$, $\beta$ reference frame $$\left(\begin{bmatrix} E\alpha \\ E\beta \end{bmatrix}\right)$$

using the following equation:

$$\begin{bmatrix} E\alpha \\ E\beta \end{bmatrix} = \begin{bmatrix} V\alpha \\ V\beta \end{bmatrix} - \left( rs * \begin{bmatrix} I\alpha \\ I\beta \end{bmatrix} \right) - \frac{d}{dt}\left( \begin{bmatrix} L\alpha\alpha & L\alpha\beta \\ L\beta\alpha & L\beta\beta \end{bmatrix} * \begin{bmatrix} I\alpha \\ I\beta \end{bmatrix} \right) \tag{3}$$

where rs is the motor's resistance and $$\begin{bmatrix} L\alpha\alpha & L\alpha\beta \\ L\beta\alpha & L\beta\beta \end{bmatrix} = \begin{bmatrix} L0 + L1 * \cos(2\theta) & L1 * \sin(2\theta) \\ L1 * \sin(2\theta) & L0 - L1 * \cos(2\theta) \end{bmatrix}.$$

The inductance value $$L0 = \frac{Ld + Lq}{2} \text{ and } L1 = \frac{Ld - Lq}{2},$$

where Ld and Lq are the d- and q-axis inductances, respectively. The speed and position estimator 260 computes rotor position $\theta$ during closed-loop operation, but the preceding equation for computing $$\begin{bmatrix} L\alpha\alpha & L\alpha\beta \\ L\beta\alpha & L\beta\beta \end{bmatrix}$$

uses rotor position $\theta$. The assumption is that the motor's inductance does not appreciably change very quickly (e.g., within one sampling instance) and thus the rotor position $\theta$ previously computed by the speed and position estimator 260 is used to compute the current value of motor inductance $$\begin{bmatrix} L\alpha \\ L\beta \end{bmatrix}.$$

In one embodiment, the speed and position estimator 260 then computes the BEMF in the d,q rotating reference frame (Ed and Eq, respectively) based on the BEMF in the $\alpha$, $\beta$ reference frame and then computes rotor speed $\omega$ and position $\theta$ as provided in equations 4-6.

$$\begin{bmatrix} Ed \\ Eq \end{bmatrix} = \begin{bmatrix} \cos(\theta) & \sin(\theta) \\ -\sin(\theta) & \cos(\theta) \end{bmatrix} * \begin{bmatrix} E\alpha \\ E\beta \end{bmatrix} \tag{4}$$

$$\omega = \frac{1}{Ke} * (Eq - \text{sgn}(\omega) * Ed) \tag{5}$$

$$\theta = \int \omega * dt \tag{6}$$

The subtractor 281 subtracts the rotor speed $\omega$ from a reference speed value $\omega$ref (the target speed for the motor and generated by the processor core 110) to produce an error value err$\omega$ 289. The error value err$\omega$ 289 is an input to the PI controller 271. In some example embodiments, the PI controllers 271, 272 and 273 are control loop software modules that employ feedback, and in other example embodiments these PI controllers are implemented in hardware. In general, a PI controller repeatedly receives an error value that is the difference between a desired setpoint (e.g., reference speed value $\omega$ref in the case of PI controller 271) and a measured process variable (e.g., rotor speed $\omega$), and generates an adjustment for another process variable based on proportional and integral terms. For example, in the case of the H controller 271, the generated adjustment is Iqrefa. During closed-loop operation, multiplexer 231 is configured to select the "1" input and thus Iqrefa is provided as the output of the multiplexer as Iqref. The operation of multiplexers 231 and 232 is described below.

Subtractor 282 subtracts Iq from Iqref to generate output value errq 285. The PI controllers 271-273 are digital controllers that implement the following equation:

$$u(t)=Kp+Ki/s \qquad (7)$$

where u(t) is the ratio of the output value to the input value (e.g., an error value) from a PI controller, Kp is a proportional gain, Ki is an integral gain, "s" is the Laplace variable. A PI controller includes a proportional component and an integral component. The proportional component operates on the present value of the error while the integral component operates on previous error values. The proportional component ensures that the steady state error becomes small, but generally cannot ensure the error to be zero. However, because it operates on present error values, the proportional component converges relatively quickly. The integral component ensures that steady state error becomes zero. However, because it operates on previous values of error (error history), it converges more slowly than the proportional component. In general, the proportional component of a PI controller reduces the error to a relatively low value, and the integral component further reduces the error to zero. The speed at which the PI controller 271 converges and any overshoot or undershoot observed are determined by the values of the proportional gain (Kp) and the integral gain (Ki).

The outputs from the Park transform 220, Id and Iq, are flux and torque current values, respectively, in the d,q rotating reference frame. The Iq component from the Park transform is subtracted from the Idref value by subtractor 282 to produce an error value errq 285. The PI controller 272 processes the value errq to compute the voltage value Vq in the (d,q) rotating reference frame. Subtractor 283 subtracts Id from a flux reference value Idref to compute a flux error value errd 291. PI controller 273 receives error value errd 291 and outputs a voltage value Vd. The voltages Vq and Vd are the q-axis and d-axis voltages, respectively, applied to the motor so that the q-axis and d-axis currents match their respective references.

The inverse Park transform 230 transforms the rotating frame flux and torque values Vd and Vq, respectively, into the corresponding values of $V\alpha$ and $V\beta$ in the $(\alpha, \beta)$ stationary orthogonal reference frame. The rotor flux position $\theta$ from the speed and position estimator 260 is also provided to the inverse Park transform 230. In one example, the Park transform computes $V\alpha$ and $V\beta$ as:

$$V\alpha=\{Vd*\cos(\theta)\}-\{Vq*\sin(\theta)\} \qquad (8)$$

$$V\beta=\{Vd*\sin(\theta)\}+\{Vq*\cos(\theta)\} \qquad (9)$$

The values $V\alpha$ and $V\beta$ are then provided to the space vector PWM 240 which uses the values $V\alpha$ and $V\beta$ to produce the signals ma, mb, and mc that drive the three-phase inverter 140. The inverter 140 converts the voltage reference values (ma, mb, mc) to duty cycles that control the on and off states of the transistors within the respective inverter phase such that the voltage on the phase's switch node applied to the motor has an average voltage that is approximately the same as the voltage reference value (ma, mb, mc). The relationship between ma-mc and the respective duty cycle is provided above.

As explained above, the values of speed ($\omega$) and rotor position ($\theta$) computed by the speed and position estimator 260 are not necessarily accurate at motor start-up because speed and position is determined from BEMF, and BEMF has relatively poor (low) signal-to-noise ratio (SNR) at low motor speeds.

The FOC block diagram of FIG. 2 also includes an auto-handoff controller 229 and multiplexers 231 and 232 (e.g., implemented in software executed by processor core 120). The auto-handoff controller 229 receives as an input the d- and q-axis estimates of BEMF (Ed and Eq, respectively) computed by the speed and position estimator 260. The auto-handoff controller 229 determines (as described below) whether the motor M is to be operated in open-loop or closed control and generates a select signal (SELECT), which is the control signal for multiplexers 231 and 232.

Any suitable technique can be implemented by the auto-handoff controller 229 to determine whether open-loop control should be performed or whether closed-loop control should be performed. In one example, the auto-handoff controller 229 repeatedly computes the BEMF of the motor M in, for example, the rotating reference frame (d,q) and determines when a vector component of the computed BEMF (e.g., the component along the q-axis) is within a threshold of the total BEMF. When the computed BEMF component is within the threshold of the total BEMF, the auto-handoff controller 229 switches the motor controller from open-loop to closed-loop control of the motor M. This technique is further described in U.S. patent application Ser. No. 17/364,540 entitled "Automatic Transition of Motor Controller From Open-Loop Control to Closed-Loop Control" and incorporated herein by reference in its entirety.

Multiplexer 231 has a first input (e.g., a 0-input) connected to the Igrefm signal and a second input (e.g., a 1-input) connected to the Iqrefa signal. The select signal SELECT indicates which of the two inputs is to provide its signal to the output. The output signal is Iqref, described above with reference to the input of subtractor 282. The 0-input receives a value labeled Igrefm, which is one of the programmable values 109 provided to the processor core 110 (FIG. 1). An external device (not shown) can transmit the value of Igrefm to the processor core 110. During open-loop operation, the SELECT signal is set to a first logic state (e.g., "0") to cause the 0-input of the multiplexer 231 to be selected. The output from the PI controller 271 is shown as Iqrefa. During closed-loop operation, the SELECT signal is set to a second logic state (e.g., "1") to cause the 1-input of the multiplexer 231 to be selected. During open-loop operation, Iqref is equal to Igrefm. During closed-loop operation, Iqref is equal to Irefa from the PI controller 271.

Multiplexer 232 also has a 0-input and a 1-input. The estimated value of rotor position $\theta$ from the speed and position estimator 260 is provided to the 1-input. The 0-input of multiplexer 232 is a calculated value $\theta\_openloop$. The open-loop value of rotor position ($\theta\_openloop$) is calculated based on the following equation for speed ($\omega$):

$$\omega = \frac{Iqrefm}{B}\left(1 - e^{\frac{-B*t}{J}}\right) \qquad (10)$$

where "t" is time measured starting from the time the motor begins to spin (i.e., time spent during open-loop operation), B is the coefficient of friction for the unloaded motor M and J is the inertia of the unloaded motor, and Iqrefm is a configuration parameter noted above. The fraction $$\frac{Iqrefm}{B}$$

represents the target speed for the motor. The values of B and J may be determined experimentally using any suitable technique. In one example, the value of B can be obtained by running the motor in a closed-loop operation and sensing/measuring the current at a given speed. That current divided by the BEMF constant provides the value of B. The value of J can be obtained by allowing the motor to spin down without external control and measuring the time the motor take to achieve half of its initial speed (T_COAST). The value of J can be calculated as B*In(2)*T_COAST. Patent application Ser. No. 17/369,000 titled "A Motor Controller and a Method for Controlling a Motor," incorporated herein by reference, describes these techniques. The processor core 110 integrates speed ($\omega$) to compute the open-loop value $\theta$_openloop as:

$$\theta\_openloop = \int (\omega) dt \tag{11}$$

Figure 5:
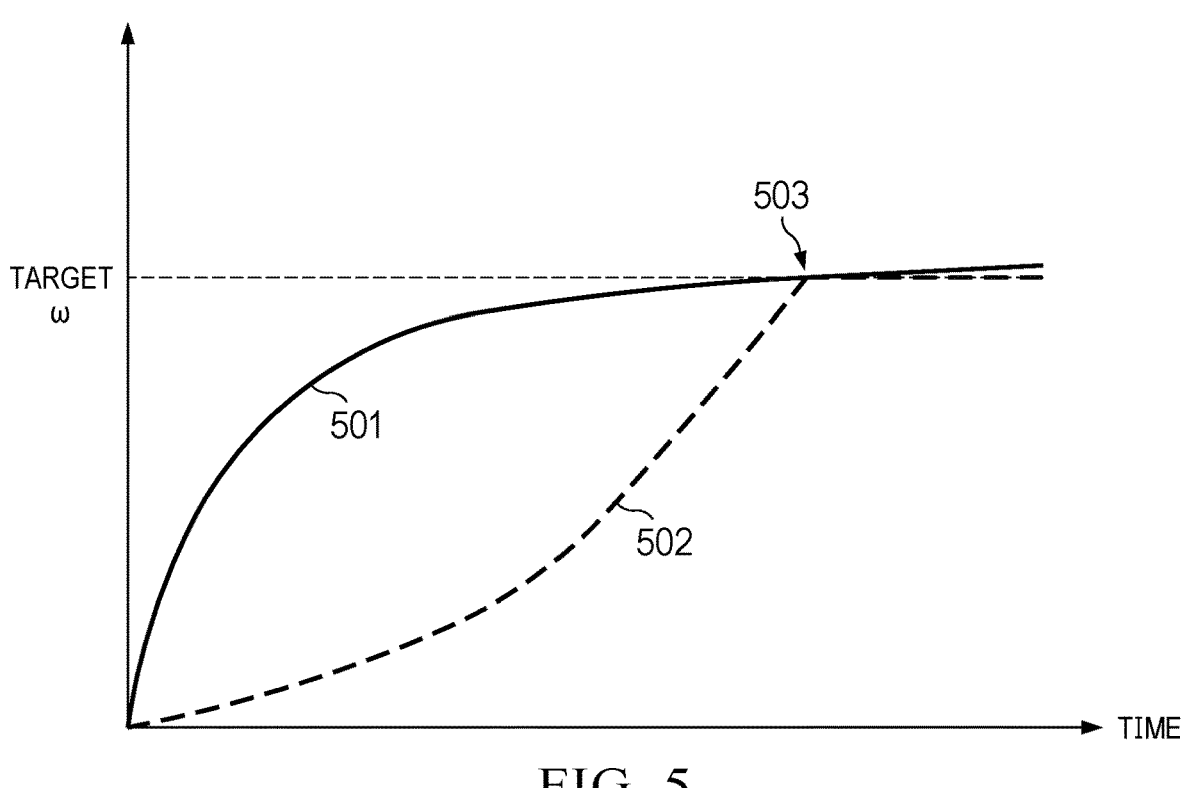
FIG. 5 is a graph illustrating examples of estimated motor speed versus time using an inverse exponential function and a quadratic function.

FIG. 5 is a graph of speed ($\omega$) with respect to time (t). Two curves 501 and 502 are shown. Curve 501 graphically illustrates the increase in the estimate of speed using the inverse exponential equation 10 above. Curve 502 graphically illustrates the increase in the estimate of speed if a quadratic equation were used as may be the case in some conventional motor control systems. For curve 501, the estimate of speed approaches its target speed much more quickly than for curve 502. Additionally, for curve 502, the speed $\omega$ increases in a quadratic relationship with respect to time until the target speed is reached (identified at reference numeral 503), and then control of the motor switches to a closed-loop control to maintain the speed at the target speed. A discontinuity of motor speed when the quadratic function is used occurs upon the speed reaching the target as shown. This discontinuity renders the motor control using the quadratic function less stable than if the inverse exponential described herein was used.

As described above, previous techniques for open-loop control of the motor used a quadratic function with respect to time, e.g., $\omega = (a1*t) + (a2*t^2)$, in which a1 and a2 are positive constants determined through trial and error, and the positive first term (a1*t) is added to the positive second term (a2*t²). In another embodiment, an approximation of the inverse exponential Eq. (10) can be used. Such an approximation has the form of a quadratic equation and is given as:

$$\omega = \frac{Iqrefm}{J} t - \frac{Iqrefm*B}{J^2} t^2 \tag{12}$$

The fraction multiplied by "t" has Iqrefm in the numerator and inertia (J) in the denominator. In the example of Eq. (12), the positive second term $$\left( \frac{Iqrefm*B}{J^2} t^2 \right)$$

is subtracted from the positive first term $$\left( \frac{Iqrefm}{J} t \right).$$

It is mathematically equivalent and within the scope of this disclosure that the second term $$\left( \frac{Iqrefm*B}{J^2} t^2 \right)$$

can be made negative and added to the positive first term $$\left( \frac{Iqrefm}{J} t \right).$$

The coefficient of $t^2$ is the ratio of the product of Iqrefm and motor friction (B) to the square of the inertia ($J^2$). As such, the constants of the first and second terms are based on the properties (e.g., friction and inertia) of the motor and are not determined through trial and error. The implementation of equation 12 may be advantageous in that it has the same general form as the quadratic equation, which may be more straightforward to implement in motor control software that already implements a quadratic equation for estimating speed during open-loop operation.

In yet another embodiment, a scaling factor ($\gamma$) can be included in equation 11 to model the operation of the motor under a mechanical load condition. A mechanical load condition is one in which the rotor of the motor has mechanical loading in the form of either external torque to be overcome, cogging, or friction. The scaling factor $\gamma$ may be in the range of 0 to 1 (e.g., 0.5). For example, the user may initialize the scaling factory to a value of 0.5 and determine the performance of the motor. If the motor loses synchronization, the scaling factor $\gamma$ should be reduced, and the motor's performance again evaluated. If the motor does not lose synchronization, then the scaling factor $\gamma$ can be increased. The scaling factor $\gamma$ is incrementally adjusted in this fashion until the largest value of scaling $\gamma$ is determined to work without the motor losing synchronization. In the example in which $\gamma$ is used, the speed equation is:

$$\omega = \frac{\gamma * Iqrefm}{J} t - \frac{\gamma^2 Iqrefm*B}{J^2} t^2 \tag{13}$$

A scaling factor ($\gamma$) can also be included in the inverse exponential equation as follows:

$$\omega = \frac{Iqrefm}{B} \left( 1 - e^{\frac{-\gamma*B*t}{J}} \right) \tag{14}$$

The select signal SELECT from the auto-handoff controller 229 causes the multiplexer 232 to select between its 0-input and its 1-input. During open-loop operation, the auto-handoff controller 229 asserts SELECT to the first logic state to cause multiplexer 232 to provide $\theta$_openloop as its output (shown in FIG. 2 as $\theta$1) to the Park transform 220 and the inverse Park transform 230. The $\theta$ inputs to the Park and inverse Park transforms described above are replaced with $\theta$1 in the embodiment of FIG. 2.

The auto-handoff controller 229 automatically (without using externally-provided parameters) determines when to switch control from open-loop to closed-loop control. The determination of when to switch from open-loop to closed-loop control is implemented by the auto-handoff controller 229 based on the calculation of BEMF from Eq. 4 above. The calculation of BEMF produces BEMF components in the d and q-axes. The value Ed is the component of BEMF along the d-axis, and the value Eq is the component of BEMF along the q-axis. The total BEMF is the sum of the Ed and Eq components (vector addition).

Figure 6:
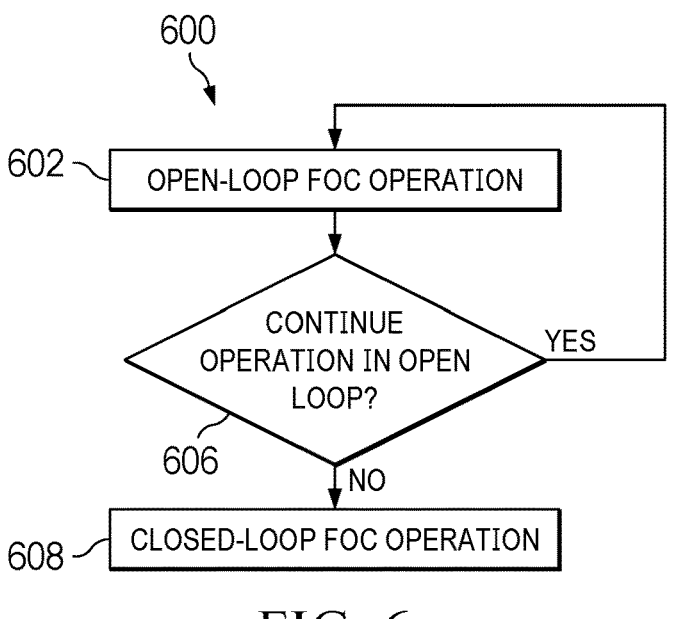
FIG. 6 is a flowchart illustrating a method for automatically changing motor control from open-loop control to closed-loop control in accordance with an example.

FIG. 6 is a flow chart 500 depicting an example method implemented by the motor controller 100. At step 602, the method includes operating the motor according to an open-loop FOC operation. This step, for example, may be implemented by processor core 110 executing software 125 to calculate motor speed ω using any of equations 10, 12, or 13 (or other equation implementing a speed profile that is approximately an inverse exponential with respect to time) and then integrating the calculated motor speed to calculate rotor position open-loop value θ_openloop. Also, the auto-handoff controller 229 asserts the SELECT signal to cause the multiplexers 231 and 232 to select their 0-inputs. Open-loop FOC operation may begin upon motor start-up (motor beginning to turn from a dead stop).

At step 606, the method includes determining (e.g., by the auto-handoff controller 229, which may be software 125 executed by the processor core 110) whether the motor should continue to be controlled in the open-loop configuration or whether control should switch to the closed-loop control. An example of implementing this decision is described above in which the processor core 110 determines whether a component of the estimated BEMF is within a threshold of the total BEMF. In one example, the component is the q-axis component of the estimated BEMF and the total BEMF is the vector sum of the first and second orthogonal components of the estimated BEMF. The threshold may be, for example, a percentage of the total BEMF. If the estimated BEMF component (e.g., Eq) is not within the threshold of the total BEMF, then the control should remain in the open-loop configuration. However, if the estimated BEMF component is within the threshold of the total BEMF, then the control should switch to the closed-loop configuration.

Regardless of how the decision is implemented by the auto-handoff controller 229 to determine when to switch from open-loop to closed-loop control, if the result of decision step 606 is "yes" (continue operating in open-loop control of motor M), software control loops back to step 602 and open-loop FOC operation continues. If the result of decision step 606 is "no" (switch to closed-loop operation of the motor), the method continues to step 608 at which point the processor core 110 executes software 125 to implement closed-loop FOC operation of the motor. In this step, the auto-handoff controller 229 changes motor operation to a closed-loop FOC control (e.g., by asserting the SELECT signal to cause the multiplexers 231 and 232 to select their 1-inputs). As described above, in closed-loop FOC operation, motor current is measured and used to derive rotor speed and position as feedback values in the FOC technique.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

In this description, unless otherwise stated, "about," "approximately" or "substantially" preceding a parameter means being within +/−10 percent of that parameter, or, if the parameter is zero, a reasonable range of values around zero.

Modifications are possible in the described embodiments, and other embodiments are possible, within the scope of the claims.

What is claimed is:

1. A motor controller adapted to be coupled to a motor having a rotor, the motor controller comprising:
   a storage device containing software; and
   a processor core coupled to the storage device and adapted to be coupled to the motor, the processor core configured to operate the motor in an open-loop control in response to determining a speed of the rotor determined based on a quadratic function, wherein the quadratic function includes a first term with respect to time and a second term with respect to a square of time, the first term including a first mechanical property of the motor, and the second term including a second mechanical property of the motor and a square of the first mechanical property.

2. The motor controller of claim 1, wherein the first mechanical property is inertia.

3. The motor controller of claim 1, wherein the second mechanical property is friction.

4. The motor controller of claim 1, wherein the first mechanical property is inertia and the second mechanical property is friction.

5. The motor controller of claim 1, wherein the processor is configured to subtract the second term from the first term.

6. The motor controller of claim 1, wherein the quadratic function includes a scaling factor.

7. The motor controller of claim 1, wherein the processor is configured to subtract the second term from the first term.

8. A method for controlling a motor having a rotor in an open-loop operation, the method comprising:

calculating rotor speed by a processor core based on a quadratic function which includes a first term with respect to time and a second term with respect to a square of time, the first term including a first mechanical property of the motor, and the second term including a second mechanical property of the motor and a square of the first mechanical property; and generating a current for the motor based on the calculated rotor speed by the processor core.

9. The method of claim 8, wherein the first mechanical property is inertia and the second mechanical property is friction.

10. The motor method of claim 8, wherein the processor is configured to subtract the second term from the first term.

11. A motor controller adapted to be coupled to a motor having a rotor, the motor controller comprising:

a semiconductor memory containing software; and a processor core coupled to the semiconductor memory and adapted to be coupled to the motor, the processor core configured to operate the motor in an open-loop control in response to determining a speed of the rotor determined based on a quadratic function, wherein the quadratic function includes a first term with respect to time and a second term with respect to a square of time, the first term including a first mechanical property of the motor and a scaling factor, and the second term including a second mechanical property of the motor, a square of the first mechanical property, and a square of the scaling factor.

12. The motor controller of claim 11, wherein the first mechanical property is inertia.

13. The motor controller of claim 11, wherein the second mechanical property is friction.

14. The motor controller of claim 11, wherein the first mechanical property is inertia and the second mechanical property is friction.

* * * * *